Feb. 2, 1932. J. W. TREW 1,843,890
APPARATUS FOR PACKING FRUIT
Filed March 1, 1930   3 Sheets-Sheet 2

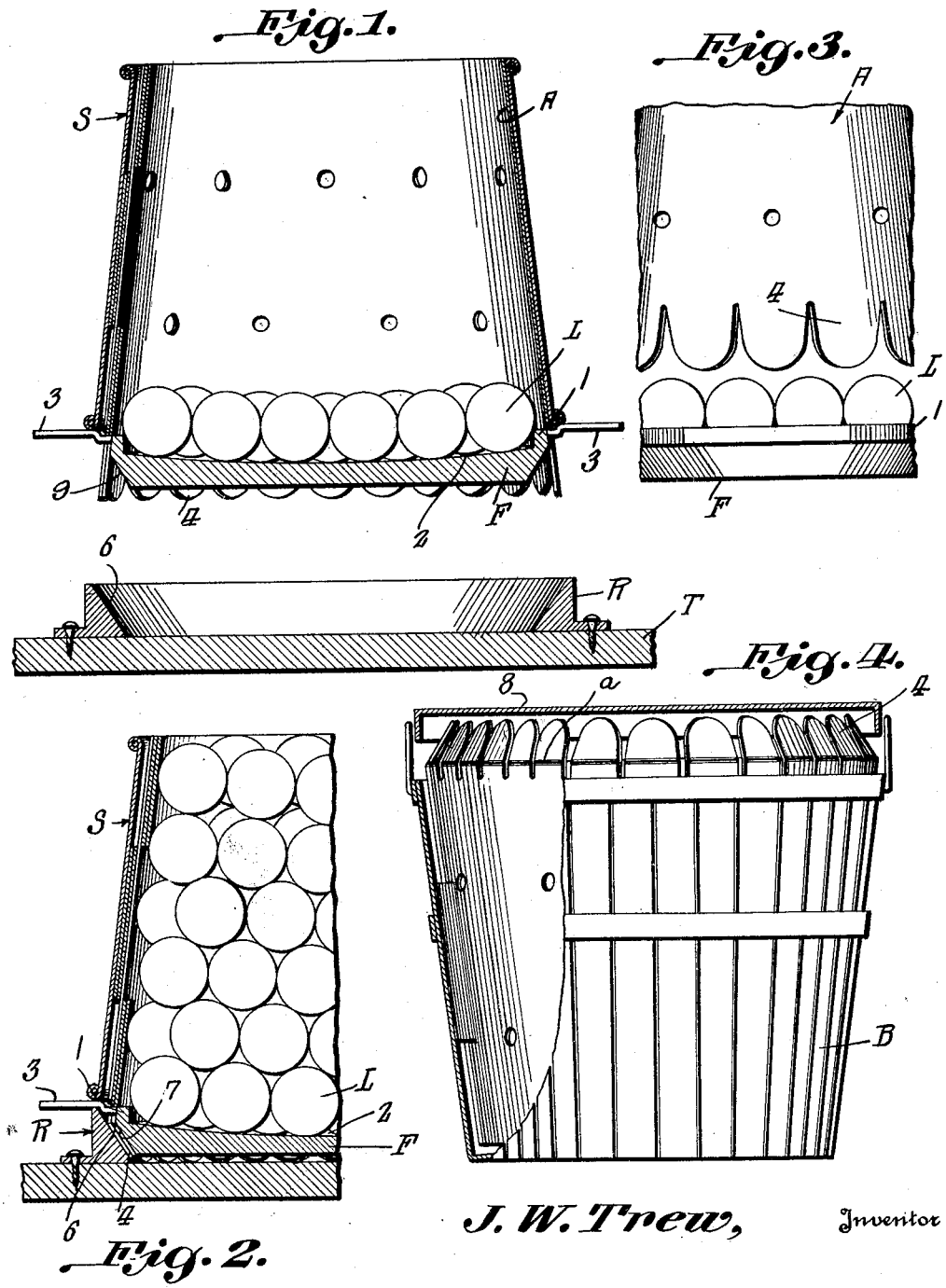

J. W. Trew, Inventor
By Watson E. Coleman
Attorney

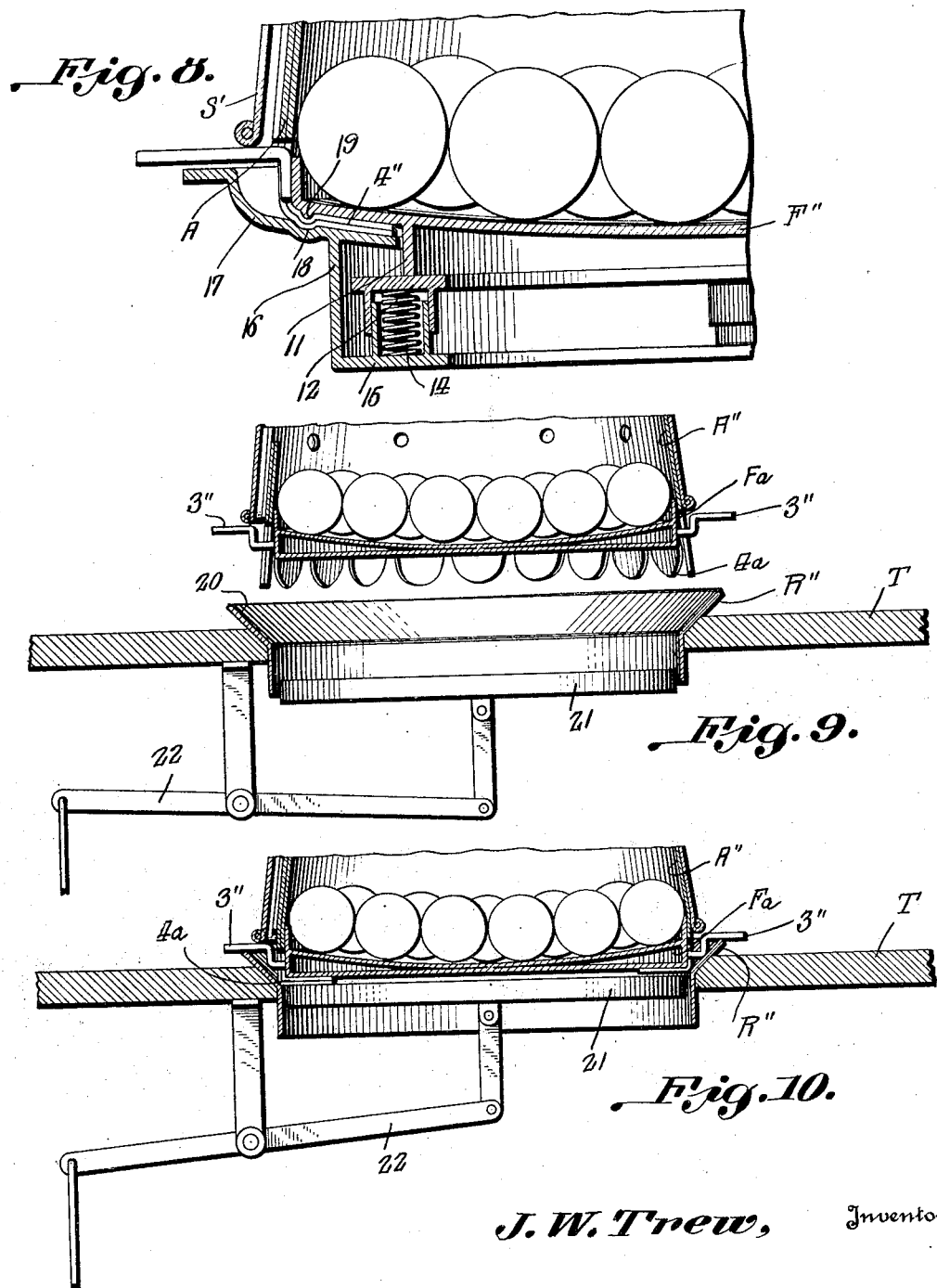

Patented Feb. 2, 1932

1,843,890

UNITED STATES PATENT OFFICE

JAMES W. TREW, OF WESTMINSTER, MARYLAND

APPARATUS FOR PACKING FRUIT

Application filed March 1, 1930. Serial No. 432,512.

This invention relates to a method and apparatus for use in packing fruit and the like, and it is an object of the invention to provide a method of packing fruit embodying the use of a facing form and a basket liner for holding the fruit in column upon the facing form before a basket is applied thereon, the liner carrying flaps for disposal inwardly of the applied basket to overlie the content of the basket when upended to protect the top layer of fruit or the like and particularly against injury when the basket cover is applied, and wherein the flaps of the liner are caused to be inwardly directed after the liner has been positioned upon the facing form.

The invention also has for its object to provide means operating in conjunction with all of the end flaps of a liner to flex or dispose said flaps inwardly of the liner.

Another object of the invention is to provide an apparatus for use in packing fruit or the like which operates to direct inwardly end flaps of a package liner and wherein said apparatus comprises two relatively movable members coacting to effect the desired bending or flexing of the flaps, one of said members constituting a facing form.

The novel features of my invention will hereinafter be definitely claimed.

In order that my invention may be the better understood, I will now proceed to describe the same with reference to the accompanying drawings, wherein:—

Figure 1 is a view partly in section and partly in elevation illustrating a step comprised in my method of packing fruit or the like and also of the apparatus employed in connection with such step, the relatively movable members of the apparatus being separated;

Figure 2 is a fragmentary view in section and partly in elevation illustrating a further step for flexing or bending the flaps of the basket liner;

Figure 3 is a fragmentary elevational view of a facing form and coacting basket liner in spaced relation, the flexing form having a layer of fruit or the like thereon;

Figure 4 is a view partly in elevation and partly in section illustrating a complete package produced in accordance with my method and apparatus;

Figure 8 is an enlarged fragmentary view partly in section and partly in elevation showing the apparatus as illustrated in Figure 7 in bending or flexing operation;

Figure 9 is a fragmentary view partly in section and partly in elevation illustrating another embodiment of my invention, the members of the apparatus being separated;

Figure 10 is a view similar to Figure 9 showing the members of the apparatus in working engagement or relation.

Figure 5:
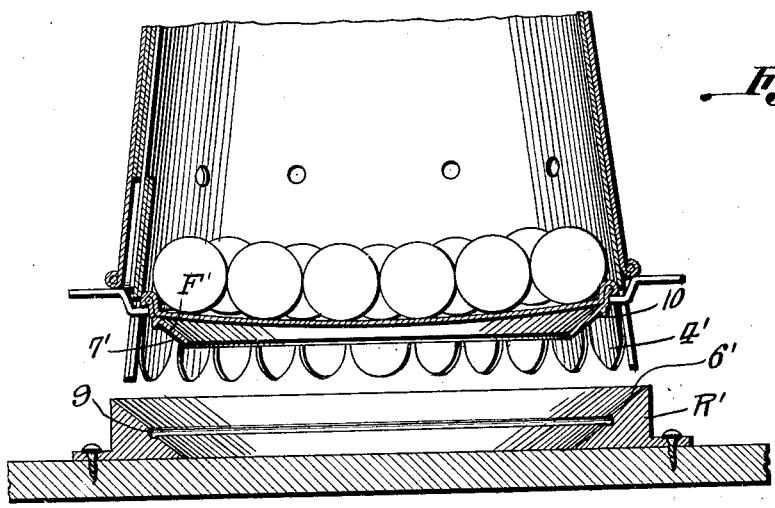
Figure 5 is a view partly in section and partly in elevation illustrating an apparatus constructed in accordance with a further embodiment of my invention with the members of said apparatus spaced apart.

In the embodiment of the invention as illustrated in Figures 1 to 4 of the drawings, F denotes a facing form of desired dimensions and upon which is adapted to be positioned a facing layer L of fruit or the like. The facing form F is preferably circular in plan and has its marginal portion defined by an upstanding retaining flange 1, and the working face 2 of the form is preferably concave.

After the facing layer L has been arranged upon the form F a shell or tub S is disposed over the form F, said shell having contact with the outstanding fingers 3 carried by the flange 1 and which fingers also constitute hand grasps to facilitate the desired manipulation of the form F and more especially for the purpose hereinafter set forth.

Before the shell or tub S is applied there is snugly inserted therein a liner A of a conventional type except that it is provided around one edge with extended flaps 4 which, when the liner A is applied within the tub or shell S, extend beyond the end of such tub or shell which directly engages or coacts with the form F. After the placement of the shell or tub S with the inserted liner A upon the form F, said form is placed within a ring R mounted upon a table T or other desired support.

The inner wall of the ring R and the lower portion of the peripheral wall of the form F are substantially similarly beveled, as at 6 and 7 respectively, so that as the form F is received within the ring R the extending flaps 4 of the liner A will be flexed inwardly as illustrated in Figure 2 and bent along the line a as particularly illustrated in Figure 4.

To assure this flexing or bending of the flaps 4 it is to be noted that the upper or major internal diameter of the ring R is such that as the form F enters the ring, the flaps 4 will engage the beveled inner wall 6 of the ring R and be guided inwardly and as the form F snugly and tightly engages within the ring R the desired bending of the flaps 4 on the line a will be effected.

The applied shell or tub S, or more particularly the liner A therein, is then filled in a well known manner with fruit after which the shell or tub S is removed. The liner A is of a character to hold the content in column free of any external independent support so that the basket B can be readily applied thereover. The basket together with the liner A and its content is then upended and which operation can be facilitated by means of the fingers 3. After this upending operation the facing form F is removed and the bending or flexing of the flaps 4, as hereinbefore referred to, will cause said flaps to automatically assume a position inwardly of the liner A and over the facing layer of the basket content. The basket lid 8 is then applied in the customary manner and the inwardly disposed flaps 4 serve to protect the facing layer of fruit or the like against injury from such applied lid 8.

As is particularly illustrated in Figure 3, it is to be noted that each of the flaps 4 is relatively broad from end to end and such width should be such to substantially bridge the space between the outer side portions of adjacent fruit so that the fruit itself will serve as means to guide the flap over the flange 1 and thus eliminate any liability of a flap 4 passing between the fruit and the flange 1.

In applying the shell or tub S with its inserted liner A, it is believed to be clearly apparent that the extended fingers 3 will be received between adjacent flaps 4 and while in the accompanying drawings I only show the use of two fingers 3 in diametrically opposed relation, it is to be understood that as many more of such fingers may be provided as the requirements of practice may deem best. It is also believed to be obvious that should it not be desired to use the fingers 3 as hand grasps such fingers may be of a length materially less than that illustrated in the drawings.

From the foregoing it is believed to be clearly apparent that the facing form F constitutes a part of an apparatus whereby the liner flaps 4 may all be readily flexed or bent inwardly after the liner and its shell or tub have been placed upon the facing form.

It is also to be particularly noticed that my invention discloses a method of packing fruit which involves the step of flexing flaps carried by a liner after the liner has been applied with respect to a facing form and that the desired flexing or bending of all the flaps is substantially simultaneous.

Figure 6:
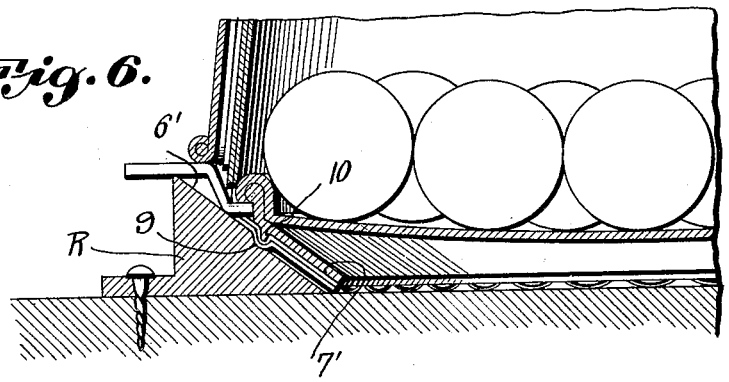
Figure 6 is a fragmentary view partly in section and partly in elevation illustrating the members of the apparatus as illustrated in Figure 5 in working engagement.

The invention as disclosed in Figures 5 and 6 is substantially the same as that embodied in Figures 1 to 4 except that the inner beveled face 6' of the ring R is provided at a desired point intermediate its ends with a continuous groove 9 constituting a female die, whereas the beveled marginal face 7' of the form F' at its upper portion is provided therearound with a depending male die 10 for coaction with the female die 9. It is also to be noted that the inner margin of the groove 9 is downwardly offset with respect to the upper margin of said groove so that as the flaps 4' pass over the beveled face 6' said groove or female die 9 will offer no undue hinderance or obstruction to such travel.

The facing form F', as illustrated in Figures 5 and 6, is of a metallic structure but as the details of such construction form no particular part of the present invention it is not believed necessary to give a specific description.

Figure 7:
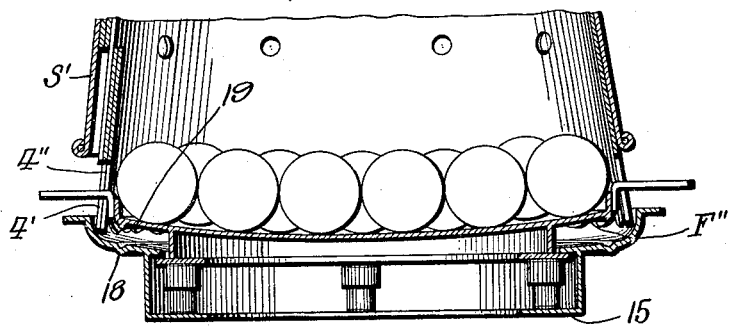
Figure 7 is a fragmentary view partly in section and partly in elevation illustrating a still further embodiment of my apparatus and also showing the initial step of applying a basket liner and its coacting tub or shell.

In the embodiment of the invention as illustrated in Figures 7 and 8, the bending or flexing apparatus is of a type whereby the desired operation thereof is materially facilitated by the weight of the content within the shell or tub S' and its inserted liner A'. The form F'' at a desired point inwardly of its periphery carries a continuous depending flange 11 which is adapted to be supported by the yielding annular table 12. This table 12 is supported by the springs 14 of desired tension and which serve to normally maintain the table 12 in a raised position. Each of the springs 14 is interposed between the table 12 and an inturned flange 15 carried by the lower marginal portion of a ring member 16.

The upper marginal portion of the ring member 16 is provided with a downwardly directed guiding flange 17 with which the flaps 4″ are adapted to engage and be forced inwardly under the marginal portion of the applied form F″.

When the facing form F″ and its facing layer thereon is first positioned upon the table 12 the flange 17 and adjacent portion of the form F″ are sufficiently spaced apart, as illustrated in Figure 7, to permit the ready passage of the flaps 4″ under the peripheral portion of the form F″. As the shell S′ and its applied liner A′ are filled with fruit the resultant weight of such content will cause the form F″ to move downwardly against the tension of the springs 14, thus effecting the desired flexing or bending of the flaps 4″. This bending or flexing can be further facilitated or assured by giving a shaking action to the form F″ or the ring 16, or more especially the flange 17 thereof.

To assure the effective bending of the flaps 4″ the flange 17 and the outer marginal portion of the form F″ are provided respectively with the coacting female die 18 and male die 19.

In the embodiment of my invention as illustrated in Figures 9 and 10, the ring or female member R″ is suitably supported by and disposed through a table T or other desired support. The upper beveled portion 20 of the ring R″ serves to guide the flaps 4a of the liner A″, as initially applied to the facing form F$^a$, inwardly, the extent of insertion of the form F$^a$ within the beveled portion of the ring R″, as herein disclosed, being limited by contact of the pins 3″ with the upper edge of the ring R″.

Working within the lower portion of the ring R″ is a head 21 operatively engaged with a rock lever 22 preferably adapted to be pedal operated. After the facing form F$^a$ with the applied liner has been properly positioned upon the ring R″, the lever 22 is operated to force the head 21 upwardly into contact with the flaps 4a and thus flex or bend the same inwardly and, as particularly illustrated in Figure 10 of the drawings, the desired bending of the flaps 4a is materially facilitated by the lower corner edge of the facing form F$^a$.

I claim:—

1. A fruit facing apparatus comprising two relatively movable members to receive therebetween an end portion of a package liner, said members upon relative movement in one direction bending inwardly the portion of the liner between the members.

2. A fruit facing apparatus comprising two relatively movable members to receive therebetween an end portion of a package liner, said members upon relative movement in one direction bending inwardly the portion of the liner between the members, one of said members having means to guide inwardly thereof said end portion of the liner.

3. The combination with a facing form with which an end portion of a package liner is adapted to be engaged; of means for bending inwardly said end portion of the liner while the liner is engaged with the facing form.

4. The combination with a facing form with which an end portion of a package liner is adapted to be engaged; of means for bending inwardly said end portion of the liner comprising a member adapted to extend around said end portion of the liner.

5. The combination with a facing form with which an end portion of a package liner is adapted to be engaged; of means for bending inwardly said end portion of the liner comprising a member adapted to extend around said end portion of the liner, the face of the member with which the end portion of the liner engages being inwardly beveled.

6. A fruit facing apparatus comprising two relatively movable members to receive therebetween an end portion of a package liner, said members upon relative movement in one direction bending inwardly the portion of the liner between the members, one of said members having a beveled face to guide inwardly thereof said end portion of the liner.

7. A fruit facing apparatus comprising two relatively movable members to receive therebetween an end portion of a package liner, said members upon relative movement in one direction bending inwardly the portion of the liner between the members, one of said members having a beveled face to guide inwardly thereof said end portion of the liner, the second member also having a beveled portion coacting with the beveled face of the first member.

8. A fruit facing apparatus comprising two relatively movable members to receive therebetween an end portion of a package liner, said members upon relative movement in one direction bending inwardly the portion of the liner between the members, said relatively movable members having means for scoring said end portion of the liner to further facilitate its inward flexure when the facing form is removed.

9. A fruit facing apparatus comprising two relatively movable members to receive therebetween an end portion of a package liner, said members upon relative movement in one direction bending inwardly the portion of the liner between the members, and yielding means for maintaining said movable members in spaced assembly.

10. A fruit facing apparatus comprising two relatively movable members to receive therebetween an end portion of a package liner, said members upon relative movement in one direction bending inwardly the portion of the liner between the members, and mechanical means for moving one of said members with respect to the other.

11. A fruit facing apparatus comprising two relatively movable members to receive therebetween an end portion of a package liner, said members upon relative movement in one direction bending inwardly the portion of the liner between the members, and coacting male and female portions carried by the members to facilitate the further bending of said end portion of the liner.

In testimony whereof I hereunto affix my signature.

JAMES W. TREW.